(12) United States Patent
Uchiya et al.

(10) Patent No.: US 12,492,326 B2
(45) Date of Patent: Dec. 9, 2025

(54) THERMALLY EXPANDABLE AND THERMOSETTING ADHESIVE SHEET

(71) Applicant: 3M INNOVATIVE PROPERTIES COMPANY, St. Paul, MN (US)

(72) Inventors: Tomoaki Uchiya, Tokyo (JP); Guanqiao Li, Sagamihara (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 363 days.

(21) Appl. No.: 17/759,895

(22) PCT Filed: Jan. 26, 2021

(86) PCT No.: PCT/IB2021/050597
§ 371 (c)(1),
(2) Date: Aug. 1, 2022

(87) PCT Pub. No.: WO2021/161118
PCT Pub. Date: Aug. 19, 2021

(65) Prior Publication Data
US 2023/0131701 A1 Apr. 27, 2023

(30) Foreign Application Priority Data
Feb. 12, 2020 (JP) .................. 2020-021585

(51) Int. Cl.
*C09J 7/35* (2018.01)
*B32B 5/02* (2006.01)
(Continued)

(52) U.S. Cl.
CPC .................. *C09J 7/35* (2018.01); *B32B 5/022* (2013.01); *B32B 7/12* (2013.01); *B32B 27/12* (2013.01);
(Continued)

(58) Field of Classification Search
CPC .... C09J 7/35; C09J 2301/408; C09J 2301/41; C09J 2301/412; C09J 2301/302;
(Continued)

(56) References Cited

U.S. PATENT DOCUMENTS 5,589,246 A * 12/1996 Calhoun .................. C09J 7/35
428/167
11,008,487 B2 5/2021 Imamura
(Continued)

FOREIGN PATENT DOCUMENTS

JP 2007106963 A 4/2007
JP 3961065 B2 8/2007
(Continued)

OTHER PUBLICATIONS

TDI Handbook, BASF, https://polyurethanes.basf.us/files/pdf/2019-TDI_Handbook_EL.pdf, 2019.*
(Continued)

*Primary Examiner* — Jennifer A Gillett
(74) *Attorney, Agent, or Firm* — Gregg H. Rosenblatt

(57) ABSTRACT

An adhesive sheet is a thermally expandable and thermosetting adhesive sheet including a substrate and a first layer provided on at least one surface of the substrate. The first layer contains an adhesive portion having an adhesive composition and thermally expandable first particles contained within the adhesive composition, and second particles provided in the adhesive portion and having different materials from those of the first particles, and each of the second particles is larger than each of the first particles.

9 Claims, 4 Drawing Sheets

(51) Int. Cl.
  *B32B 7/12* (2006.01)
  *B32B 27/12* (2006.01)
  *B32B 27/36* (2006.01)
  *C08K 7/18* (2006.01)

(52) U.S. Cl.
  CPC ............... *B32B 27/36* (2013.01); *C08K 7/18* (2013.01); *B32B 2250/02* (2013.01); *B32B 2255/10* (2013.01); *B32B 2255/26* (2013.01); *B32B 2260/021* (2013.01); *B32B 2260/046* (2013.01); *B32B 2307/542* (2013.01); *B32B 2405/00* (2013.01); *C08K 2201/003* (2013.01); *C09J 2301/1242* (2020.08); *C09J 2301/408* (2020.08); *C09J 2301/412* (2020.08)

(58) Field of Classification Search
  CPC .......... C09J 2301/124; C09J 2301/1242; C09J 2301/206; C09J 5/08; H02K 3/34; B32B 7/12; B32B 27/12; B32B 27/36; B32B 2250/02; B32B 2255/10; B32B 2255/26; B32B 2260/021; B32B 2260/046; B32B 2307/542; B32B 2405/00; B32B 2307/718; B32B 3/266; C08K 7/18; C08K 2201/003
  See application file for complete search history.

(56) References Cited

U.S. PATENT DOCUMENTS

| | | |
|---|---|---|
| 11,479,696 B2 | 10/2022 | Lei et al. |
| 2007/0224378 A1 | 9/2007 | Takeuchi et al. |
| 2010/0143711 A1* | 6/2010 | Daigaku ............ C09J 7/385 428/343 |
| 2010/0288431 A1 | 11/2010 | Bossaert et al. |
| 2014/0044957 A1* | 2/2014 | Hirayama ............ H01L 24/97 156/247 |
| 2015/0240136 A1 | 8/2015 | Elgimiabi |
| 2015/0284607 A1 | 10/2015 | Imamura |
| 2016/0254559 A1 | 9/2016 | Nakano et al. |
| 2016/0340555 A1 | 11/2016 | Ueki |
| 2016/0348555 A1 | 12/2016 | Tsuchiya et al. |
| 2018/0134926 A1* | 5/2018 | Lei ..................... B32B 5/22 |
| 2018/0282592 A1 | 10/2018 | Cura et al. |
| 2019/0326042 A1* | 10/2019 | Takagi ............... C09J 5/06 |
| 2021/0207010 A1 | 7/2021 | Takagi et al. |

FOREIGN PATENT DOCUMENTS

| | | |
|---|---|---|
| JP | 2011244596 A | 12/2011 |
| JP | 2013-104044 A | 5/2013 |
| JP | 2014111698 A | 6/2014 |
| WO | 2013013128 A2 | 1/2013 |
| WO | 2016163514 A1 | 10/2016 |
| WO | 2019/226819 A1 | 11/2019 |

OTHER PUBLICATIONS

E. Carsalade et al., Transitions/relaxation in polyester adhesive/PET system, Journal of Thermal Analysis and Calorimetry (2010) 101(3), 849-857.*
English Machine Translation of JP 2014-111698.*
International Search Report for PCT Application No. PCT/IB2021/050597, mailed on May 18, 2021, 3 pages.

* cited by examiner

Example 1

Comparatice Example 1

| Examples | Adhesive | SE 050T | SE 030T | J5P | MEK | Second Particle Volume Fraction | Adhesive Application Amount [g/m²] | Paper Surface Adhesive Application Amount [g/m²] | Total Thickness [mm] | L [mm] | Rz [mm] | t [mm] | Blocking (Against Paper) | Shear Force [MPa] |
|---|---|---|---|---|---|---|---|---|---|---|---|---|---|---|
| Example 1 | 15 | 2 | | | 0.86 | 16% | 49.6 | 47.3 | 0.193 | 0.063 | 0.014 | 0.049 | 4 | 2.0 |
| Example 2 | 15 | 3 | | | 1.29 | 22% | 51.6 | 47.3 | 0.196 | 0.064 | 0.017 | 0.047 | 4 | 3.7 |
| Example 3 | 15 | 4 | | | 1.71 | 28% | 50.9 | 47.3 | 0.194 | 0.065 | 0.016 | 0.049 | 5 | 3.4 |
| Example 4 | 15 | 5 | | | 2.14 | 33% | 51.7 | 47.3 | 0.196 | 0.070 | 0.017 | 0.053 | 5 | 2.3 |
| Example 5 | 15 | 9 | | | 3.86 | 47% | 52.9 | 45.7 | 0.195 | 074 | 029 | 045 | 5 | 1.8 |
| Example 6 | 15 | | 5 | | 2.14 | 33% | 46.7 | 50.7 | 0.186 | 061 | 026 | 035 | 4 | 1.1 |
| Example 7 | 15 | | 7 | | 3.00 | 40% | 3.00 | 50.7 | 0.181 | 0.063 | 0.022 | 0.041 | 5 | 1.1 |
| Comparative Example 1 | No Single Sided Paper | 0 | | | 0 | 0 | 45.4 | 45.7 | 0.171 | 0.045 | 0.005 | 0.040 | 1 | 3.2 |
| Comparative Example 2 | 15 | | | 3 | 1.29 | 22% | 47.3 | 45.7 | 0.173 | 0.050 | 0.007 | 0.043 | 3 | 0.8 |
| Comparative Example 3 | Single Sided Paper | 0 | | | 0 | 0 | 45.4 | 45.7 | 0.193 | | | | 5 | 6.2 |

FIG. 4

THERMALLY EXPANDABLE AND THERMOSETTING ADHESIVE SHEET

TECHNICAL FIELD

One aspect of the present disclosure relates to a thermally expandable and thermosetting adhesive sheet.

BACKGROUND

In the related art, as an adhesive sheet, there is one described in Patent Document 1. The adhesive sheet is a thermally expandable adhesive sheet, and is provided with a substrate, two thermally expandable adhesive portions provided on both sides of the substrate, and two adhesive permeable layers provided on the surface of each of the two adhesive portions, and are capable of permeating an adhesive material upon thermal expansion of the adhesive material. By heating the adhesive sheet, it is possible to expand the adhesive sheet and, at the same time, cause the adhesive to appear on an outermost surface of the adhesive sheet.

CITATION LIST

Patent Literature

Patent Document 1: JP 2019-203062 A

SUMMARY

Technical Problem

Here, the adhesive sheet described above is provided with a nonwoven fabric as an adhesive permeable layer on both sides of the substrate. In this case, the nonwoven fabric is subject to restrictions on thickness and density. For example, in a case where the nonwoven fabric is too thin, there is a problem in that the adhesive tends to seep out, and the manufacturing stability and storage stability are deteriorated. Also in a case where the density of the nonwoven fabric is too low, there is a similar problem. In a case where the nonwoven fabric is too thick, there is a problem in that the adhesive does not seep properly. Also in a case where the density of the nonwoven fabric is too high, there is a similar problem. Therefore, the adhesive sheet is required to be provided with a nonwoven fabric set to a thickness and density in a predetermined range. In this case, there is a problem in that a degree of freedom of design of the adhesive sheet decreases.

Solution to Problem

An adhesive sheet according to an aspect of the present disclosure is a thermally expandable and thermosetting adhesive sheet including a substrate and a first layer provided on at least one surface of the substrate, in which the first layer contains an adhesive portion having thermally expandable first particles and second particles having different materials from those of the first particles, and the second particle is larger than the first particle.

Advantageous Effects of Invention

According to an aspect of the present disclosure, it is possible to provide an adhesive sheet that can improve the degree of freedom of design.

BRIEF DESCRIPTION OF DRAWINGS

FIG. 4 is a table showing experimental conditions and experimental results.

DETAILED DESCRIPTION

Detailed descriptions of the embodiments according to the present disclosure will be given below with reference to the attached drawings. In the description of the drawings, identical or equivalent elements are denoted by the same reference signs, and redundant description of such elements will be omitted.

Hereinafter, an embodiment of the present invention will be described in detail. An example in which an adhesive sheet is applied to a motor will be described below. A stator body of the motor has a cylindrical shape and has a plurality of slots along an inner circumference of a cylinder. A coil for the motor is disposed in the slot. In general, the stator body and the coil are adhered to each other and are electrically isolated from each other.

In the related art, an insulator was interposed between the stator body and the coil, and the members were adhered and fixed by penetrating a liquid adhesive into a gap. An adhesive sheet is disposed between the stator body and the coil of the motor, which are members to be adhered, and the two members to be adhered are united by an adhesive force of the adhesive sheet. A predetermined gap is provided between the adhesive surfaces of the two members to be adhered, and an adhesive sheet is disposed in the gap.

When the stator body and the coil are adhered to each other, first, the adhesive sheet is prepared in a state before the adhesive sheet exerts an adhesive force, that is, in a tack-free state, and the adhesive sheet is disposed between the adhesive surfaces of the members to be adhered. At this time, the thickness of the adhesive sheet is preferably slightly narrower than the gap between the members to be adhered. Then, after disposing the adhesive sheet at a predetermined position, the adhesive sheet is heated to change from a tack-free state to a state having an adhesive force on the surface.

Figure 1:
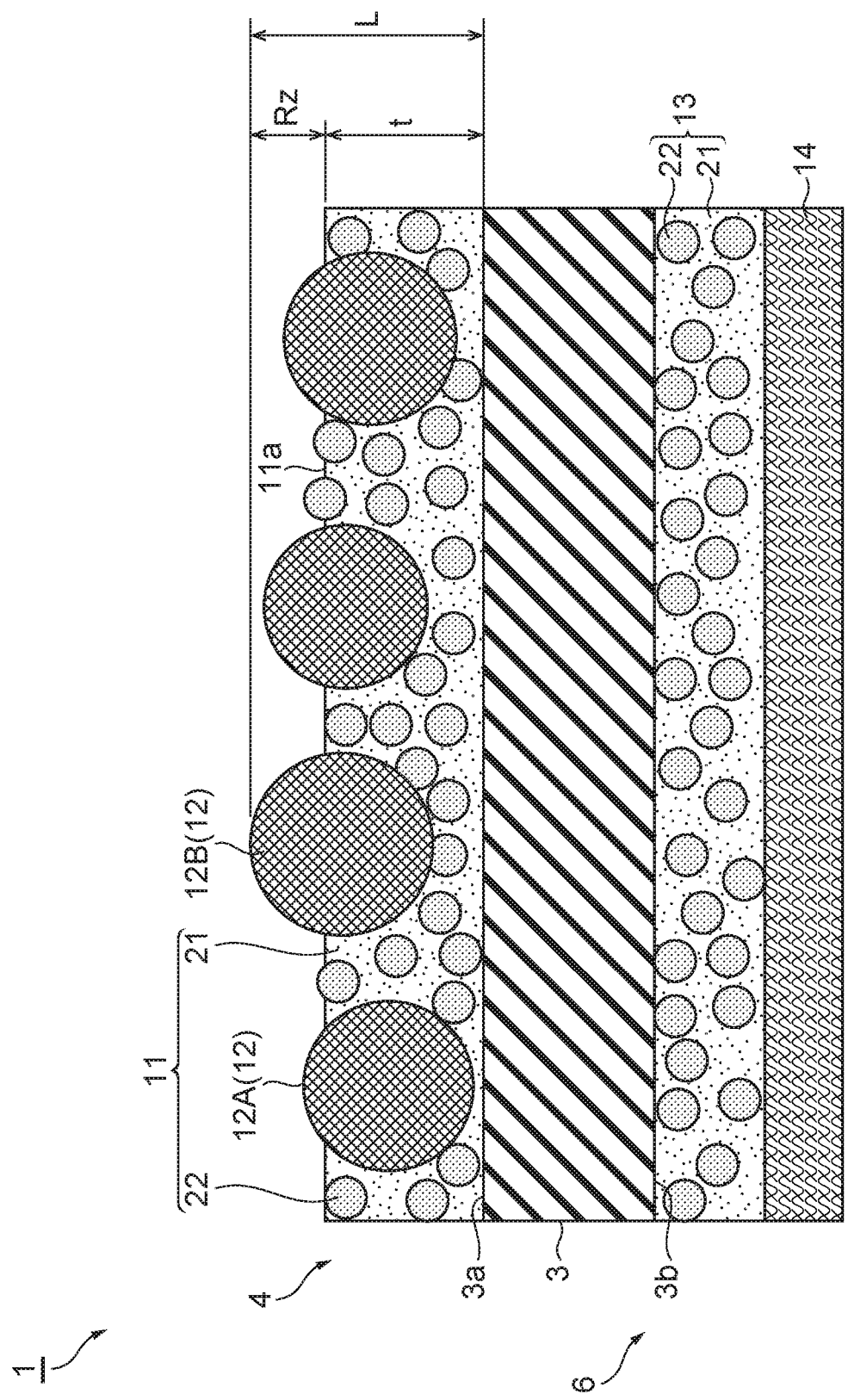
FIG. 1 is a cross-sectional view illustrating a state prior to thermal expansion of an adhesive sheet according to an embodiment of the present disclosure.

FIG. 1 is a cross-sectional view illustrating a configuration of the adhesive sheet. More specifically, FIG. 1 is a cross-sectional view of the adhesive sheet before the adhesive sheet exerts the adhesive force, that is, in a tack-free state. As illustrated in FIG. 1, an adhesive sheet 1 in a tack-free state is provided with a plate-like substrate 3, a first layer 4, and a second layer 6. The first layer 4 is provided on one main surface 3a of the substrate 3. The second layer 6 is provided on the other main surface 3b of the substrate 3. The first layer 4 is provided with an adhesive portion 11 and second particles 12. The second layer 6 is provided with an adhesive portion 13 and an adhesive permeable layer 14.

The substrate 3 is a base portion for forming the adhesive portions 11 and 13, and is a member that substantially defines the size of the adhesive surface of the adhesive sheet 1. For example, a polyethylene naphthalate (PEN) film may be used as the substrate 3 in consideration of strength, heat resistance, insulation properties, and the like. With the proviso that, since it is sufficient to function as a base for forming the adhesive portions 11 and 13 during the manufacturing stage of the adhesive sheet 1, any material may be used as long as it has strength for supporting the adhesive portions 11 and 13 and does not reduce the adhesive force of the adhesive constituting the adhesive portions 11 and 13 when heated. The thickness of the substrate 3 may be adjusted in consideration of the gap of the materials to be adhered. That is, the adhesive sheet 1 not only adheres the stator body of the motor to the coil, which are the materials to be adhered, but also plays a role of creating a gap between the members to be adhered. Therefore, when the gap is large, the thickness of the substrate 3 can be increased so that the gap can be appropriately filled.

The adhesive portion 11 of the first layer 4 is a layer of thermally expandable adhesive formed on one main surface 3a of the substrate 3. The thickness of the adhesive portion 11 is set to be 10 µm or greater and 300 µm or less. The adhesive portion 11 contains an adhesive composition 21 and first particles 22. Note that an adhesive material is also a type of the adhesive.

The adhesive composition 21 can be a substance that is substantially solid at room temperature, is flowable upon heating, and hardened when cooled. A thermosetting epoxy-based adhesive composition can be used as the adhesive composition 21.

Examples of an epoxy resin contained in the thermosetting epoxy-based adhesive composition include those obtained from an epoxy compound (monomer epoxy compound or polymer epoxy compound) having at least one oxirane ring that can be polymerized by a ring-opening reaction. The epoxy compound may be aliphatic, cycloaliphatic, aromatic, or heterocyclic. A bisphenol epoxy resin such as a bisphenol A type epoxy resin and a bisphenol F type epoxy resin, an epoxy resin having an aliphatic skeleton such as hexanediol diglycidyl ether, a glycidylamine type epoxy resin such as triglycidylaminophenol, a novolac epoxy resin such as a phenol novolac epoxy resin, a cresol novolac epoxy resin, a brominated epoxy resin, and a cycloaliphatic epoxy resin, and mixtures thereof can be used, but examples thereof are not limited thereto.

As a curing agent or curing accelerator contained in the thermosetting epoxy-based adhesive composition, various thermal curing agents known in the art as being usable as a thermal curing agent for an epoxy resin can be used. Examples of the thermal curing agent include a compound that react with an oxylane ring of epoxide to cause substantial cross-linking of the epoxide to form a crosslinked polymer network. These compounds contain at least one nucleophilic or electrophilic moiety (for example, active hydrogen atom) which causes a crosslinking reaction. Note that, as understood by one of ordinary skill in the art, the thermal curing agent and the curing accelerator are often indistinguishable from each other. The curing agent is not particularly limited as long as the curing agent is capable of curing the epoxy resin by heat, but a latent curing agent that is inactive at around room temperature and is activated by heat. Examples of the latent curing agent include dicyandiamide and a derivative thereof, a hydrazide compound, a boron trifluoride-amine complex, a reaction product of an amine compound with an isocyanate compound or a urea compound (urea derivative), and the like. A latent curing accelerator may be used in combination with an epoxy resin curing agent. Examples of the curing accelerator include an imidazole compound, a reaction product of an amine compound with an epoxy compound (amine-epoxy adduct), a urea derivative, and the like.

The adhesive composition may further optionally contain additional components such as a thermoplastic resin (phenoxy resin (polyhydroxypolyether synthesized from bisphenols and epichlorohydrin) or the like), a toughening agent (such as a core shell agent), a rheology agent (such as a nanosilica particle), a silane coupling agent, a flame retardant, an impact modifier, a heat stabilizer, a processing aid, a lubricant, a reinforcing agent, a colorant, a photopolymerization initiator, a crosslinking agent, and a chain transfer agent. Various agents that are known in the related art can be used as each of such additional components.

The first particles 22 are thermally expandable particles contained within the adhesive composition 21. The first particles 22 are present in a substantially uniformly mixed state within the adhesive composition 21. The first particles 22 are thermally expanded by being heated. By thermally expanding the first particles 22, a volume of the entire adhesive portion 11 increases (refer to FIG. 2). A particle diameter of the first particle 22 may be smaller than 50 µm and may even be smaller than 40 µm. Note that the particle diameter is determined by a laser diffraction particle size distribution measurement apparatus. Examples of the material of the first particles 22 include those having a capsule structure in which as the thermoplastic resin, a vinylidene chloride polymer, an acrylonitrile copolymer, or an acrylic polymer is uses as an outer shell, and isobutane, isopentane, or the like is encapsulated as a foaming agent.

Figure 2:
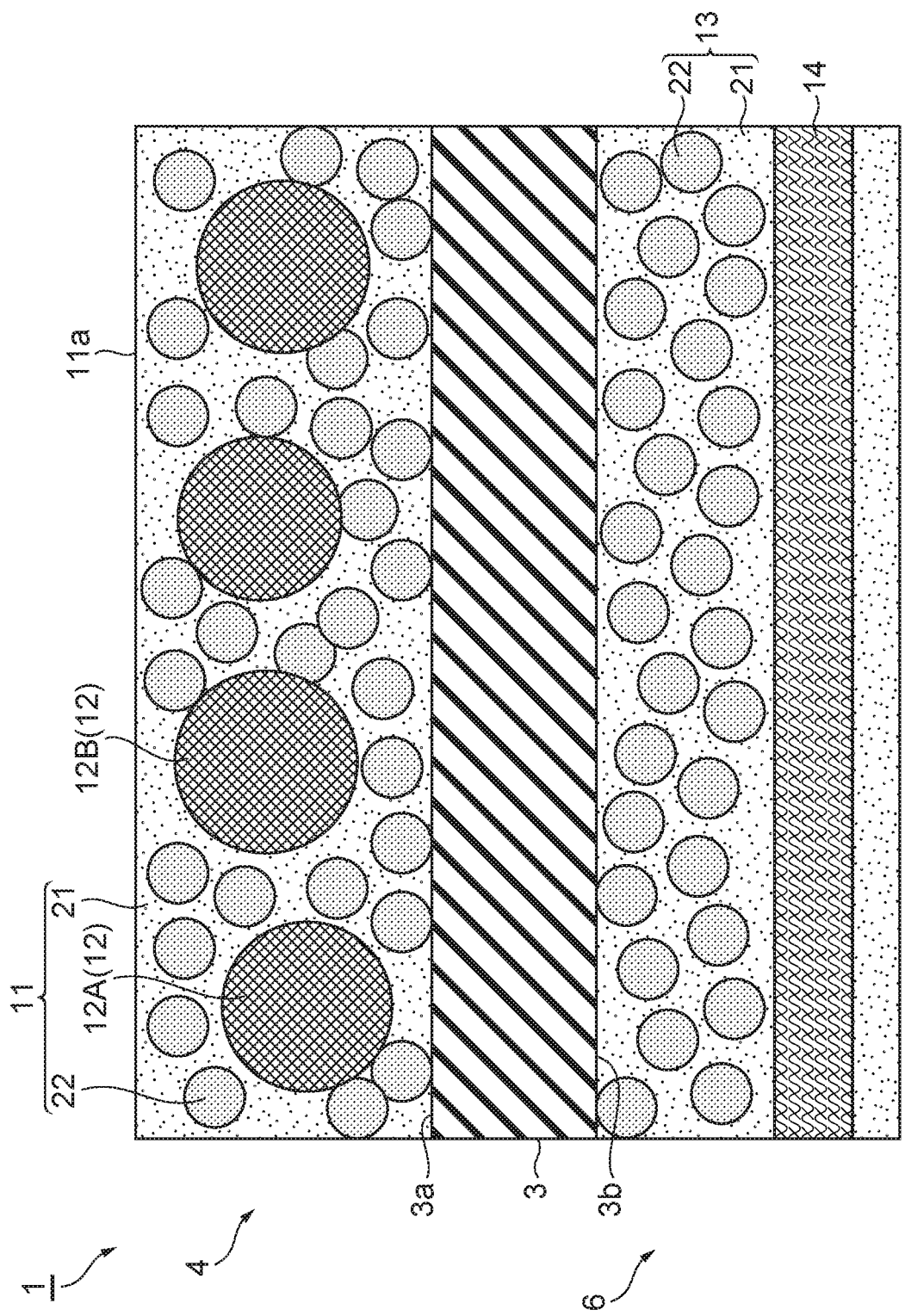
FIG. 2 is a cross-sectional view illustrating a state after thermal expansion of the adhesive sheet illustrated in FIG. 1.

The second particles 12 of the first layer 4 are particles arranged within the adhesive portion 11 and having different materials from those of the first particles 22. Some of the second particles 12 protrude from the surface 11a of the adhesive portion 11 in the previous stage (the state of FIG. 1) before the adhesive portion 11 thermally expands. As a result, the second particles 12 function as members that separate the surface 11a of the adhesive portion 11 from the member to be adhered. Also, upon thermal expansion of the adhesive portion 11, the adhesive composition 21 overflows from the gaps between a plurality of second particles 12. As a result, the second particles 12 allow the surface 11a of the adhesive portion 11 to be exposed to the member to be adhered (the state as illustrated in FIG. 2). Specifically, a thickness of the adhesive portion 11 is defined as "t", and a distance between an outer end (most protruding point) of one of the second particles 12 and the main surface 3a of the substrate 3 is defined as "L". In this case, a relationship "L>t" is established. At this time, a protruding amount of the second particle 12 satisfies "Rz (=L−t)". The protruding amount Rz may be greater than 6 µm or less than 60 µm. In the following description, unless otherwise specified, a state before the adhesive portion 11 thermally expands (the state as illustrated in FIG. 1) will be described.

The second particle 12 is larger than one of the first particles 22. As a result, the second particles 12 easily protrude from the surface 11a of the adhesive portion 11. Specifically, the particle diameter of the second particle 12 may be greater than 10%, or even greater than 400% of the particle diameter of the first particle 22. The particle diameter of the second particle 12 may be larger than 10 µm and may even be larger than 20 µm. Additionally, the second particle 12 may be larger than the thickness of the adhesive portion 11. That is, the particle diameter of the second particle 12 may be larger than the thickness of the adhesive portion 11. In this case, even when the second particle 12 is arranged at a position in the vicinity of the main surface 3a of the substrate 3 (refer to, for example, a second particle 12A), the second particle 12 protrudes from the surface 11a of the adhesive portion 11. With the proviso that, the second particle 12 may be smaller than or equal to the thickness of the adhesive portion 11. Since the second particle 12 may be arranged at a position spaced from the main surface 3a of the substrate 3 (refer to, for example, a second particle 12B), the second particle 12 can protrude from the adhesive portion 11 regardless of size. Note that an upper limit value of the particle diameter of the second particle 12 is not particularly limited, and when the adhesive portion 11 is thermally expanded, the surface 11a of the adhesive portion 11 is set to a size that can be exposed to the side of the member to be adhered.

The second particle 12 may have a spherical shape. The shape of the second particle 12 is not particularly limited and may be a polyhedron shape. With the proviso that, in a case where the second particle 12 has a flat shape, the second particle 12 do not protrude from the surface 11a or the protruding amount becomes smaller depending on the posture of the second particle 12 within the adhesive portion 11. Therefore, the second particle 12 preferably has a shape in which there is little change in size due to the direction of measurement. Specifically, a value (dimension of a major axis) measured from a direction where the dimension of the second particle 12 is greatest is preferably within a range of 200% or less relative to the value measured from the smallest dimension (dimension of a minor axis). Note that the particle diameter of the second particle 12 is determined by the size of the minor axis.

The second particle 12 may be formed of a heat-resistant material. The second particle 12 may be formed of a low thermally expandable material as compared with at least the first particle 22. The second particle 12 may be formed of an organic material or may be formed of an inorganic material. Specifically, examples of the organic materials include materials such as a crosslinked (meta)acrylic ester copolymer, crosslinked polystyrene, crosslinked urethane, crosslinked silicone, and nylon. Examples of the inorganic materials include materials such as silica, aluminum hydroxide, magnesium hydroxide, aluminum oxide, magnesium oxide, titanium oxide, and zirconium oxide.

The adhesive portion 13 of the second layer 6 has a configuration similar to that of the adhesive portion 11 of the first layer 4.

The adhesive permeable layer 14 of the second layer 6 permeates the adhesive composition 21 from one main surface side of the adhesive permeable layer 14 to the other main surface side when the first particles 22 of the adhesive portion 13 expand. More specifically, the adhesive permeable layer 14 is provided with a structure having at least a plurality of holes leading through from one main surface to the other main surface. With the adhesive permeable layer 14 having the structure having a plurality of holes, when the adhesive composition 21 which is in contact with only one main surface of the adhesive permeable layer 14 before heating expands, the adhesive composition 21 can reach onto the other main surface of the adhesive permeable layer 14 through the holes. Furthermore, a material having a glass transition temperature higher than a curing starting temperature of the adhesive composition 21 is selected as the material constituting the adhesive permeable layer 14. Specific examples of the materials that can be used as the adhesive permeable layer 14 include natural fibers, chemical fibers, or a mixture thereof based on a nonwoven fabric based on cellulose. Since such a nonwoven fabric has a large number of through holes therein, the adhesive composition 21 that is in contact with one of the main surfaces can pass through the nonwoven fabric and reach the other main surface under certain conditions.

The nonwoven fabric preferably has a basis weight of at least 10 g/m$^2$, preferably 11 g/m$^2$. This is because, as a result of experimentation by the inventors, in a case where the basis weight of the nonwoven fabric is too small, sufficient adhesive strength cannot be obtained after curing the adhesive composition 21. Furthermore, in a case where the basis weight of the nonwoven fabric is too small, the adhesive composition 21 is immersed from the nonwoven fabric during the process of manufacturing the adhesive sheet, and blocking occurs while being stored in a rolled state. Additionally, the nonwoven fabric preferably has a thickness of 50 µm or smaller, and preferably 47 µm or smaller. As a result of the experiment by the inventors or the like, when the thickness of the nonwoven fabric is too large, the amount of adhesive that oozes to the surface of the nonwoven fabric is reduced when the adhesive sheet is heated, and the shear adhesive strength of the adhesive sheet 1 decreases.

When using the adhesive sheet 1, the adhesive sheet 1 in a tack-free state is disposed between the adhesive surfaces of the members disposed with a predetermined gap. At this time, since the adhesive sheet 1 is in the tack-free state, it is possible to prevent the adhesive sheet 1 from being unintentionally attached to the member, and the adhesive sheet 1 can be easily disposed even in a case where the gap between the members to be adhered is relatively narrow. After the adhesive sheet 1 is disposed in a certain position between the members to be adhered, the adhesive sheet 1 is heated so that the adhesive sheet 1 transitions from the tack-free state to a state with adhesive force on the surface.

FIG. 2 is a cross-sectional view illustrating a configuration of the adhesive sheet. More specifically, FIG. 2 is a cross-sectional view of the adhesive sheet in a state where the adhesive sheet exerts the adhesive force.

In the state illustrated in FIG. 2, a layer configuration of the adhesive sheet 1 differs from a layer configuration of the adhesive sheet 1 in the tack-free state. In the state illustrated in FIG. 2, unlike the state illustrated in FIG. 1, the second particles 12 are embedded within the adhesive portion 11 provided on one main surface 3a of the substrate 3. In addition, the adhesive permeable layer 14 is embedded within the adhesive portion 13 provided on the other main surface 3b of the substrate 3. As a result, the adhesive force is provided on both sides of the adhesive sheet 1.

When the adhesive sheet 1 in the tack-free state is heated, the adhesive portions 11 and 13 expand. As a result, the second particles 12 on the surface 11a of the adhesive portion 11 are pressed against the adhesive surface of the member to be adhered. With further thermal expansion of the adhesive portion 11, the adhesive composition 21 overflows from the gaps between the second particles 12. A phenomenon in which the adhesive composition 21 oozes to the outer surface of the gaps between the second particles 12 occurs at one main surface of the adhesive sheet 1. On the other hand, the adhesive permeable layer 14 on the surface of the adhesive portion 13 is pressed against the adhesive surface of the member to be adhered. Then, due to the further expansion of the adhesive portion 13, the adhesive composition 21 enters the adhesive permeable layer 14 and oozes to the outer surface of the adhesive permeable layer 14. A phenomenon in which the adhesive composition 21 oozes to the outer surface of the adhesive permeable layer 14 occurs at the other main surface of the adhesive sheet 1.

Therefore, when the adhesive sheet 1 in the tack-free state illustrated in FIG. 2 is heated, the adhesive composition 21 above the substrate 3 passes through the gaps between the second particles 12 above the substrate 3 and appears on the upper surface of the adhesive sheet 1. As a result, the adhesive composition 21 is interposed between the second particle 12 and the adhesive surface of the member to be adhered, and the second particles 12 are substantially embedded in the adhesive portion 11. Furthermore, the adhesive composition 21 below the substrate 3 permeates through the adhesive permeable layer 14 below the substrate 3, and appears on the lower surface of the adhesive sheet 1. As a result, the adhesive composition 21 is interposed between the adhesive permeable layer 14 and the adhesive surface of the member to be adhered, and the adhesive permeable layer 14 are substantially embedded in the adhesive portion 13. In the state illustrated in FIG. 2, the adhesive sheet 1 is in a state of exhibiting adhesive force because the adhesive composition 21 is present on the outermost surface of the adhesive sheet 1. Then, by curing the adhesive composition 21, the members to be adhered can be adhered to each other by the adhesive sheet 1. Furthermore, when the adhesive composition 21 expands by heating the adhesive sheet 1, the second particles 12 and the adhesive permeable layer 14 are embedded in the adhesive portions 11 and 13 and left in the adhesive portions 11 and 13, and therefore, the second particles 12 and the adhesive permeable layer 14 function as members that suppress the spread in the planar direction of the adhesive composition 21.

In this way, by allowing the adhesive sheet 1 in the tack-free state to transition to a state where there is adhesive force on both surfaces, the adhesive sheet 1 can be easily disposed at a predetermined position. Furthermore, by allowing the adhesive sheet 1 to expand and conform to the surface shape of the adhesive surface, the gap between the members to be adhered can be embedded, and even if processing tolerances have occurred on the surface of the adhesive surface, the members to be adhered can be suitably adhered to each other regardless of tolerance.

In addition, the adhesive sheet 1 can also be used in a folded state depending on the shape of the gap between the members to be adhered.

As described above, the adhesive sheet is a thermally expandable and thermosetting adhesive sheet including a substrate and a first layer provided on at least one surface of the substrate, in which the first layer containing an adhesive composition, and an adhesive portion having thermally expandable first particles contained within the adhesive composition, and second particles provided in the adhesive portion and having different materials from those of the first particles, and the second particle is larger than the first particle.

In this adhesive sheet, the first layer is disposed within the adhesive portion and is provided with second particles having different materials from those of the first particles. The second particle is larger than the first particle. Thus, some of the second particles can protrude from the surface of the adhesive portions. Prior to the thermal expansion, the protrusions of the second particles can separate the surface of the adhesive portion from the member to be adhered. On the other hand, when the adhesive portion thermally expands, the adhesive portion overflows from the gaps between the second particles. As a result, the adhesive portion can be adhered to the member to be adhered. The first layer has a configuration in which the second particles are arranged in the adhesive portion, unlike the configuration in which the adhesive permeable layer is provided on the adhesive portion. Therefore, as compared to the adhesive permeable layer, the second particles have little impact on the thickness of the first layer, and the like. Therefore, a degree of freedom of design of the adhesive sheet can be improved.

The adhesive sheet is not particularly limited as long as the adhesive sheet includes the first layer described above at least on one surface of the substrate, and the configuration of the other surface is not particularly limited. For example, those in which an adhesive portion is not provided on the other surface of the substrate and the surface of the substrate is exposed may be employed as the adhesive sheet. In addition, as the adhesive sheet, those in which the first layer is provided on both surfaces of the substrate may be employed.

The second particle may be larger than the thickness of the adhesive portion. In this case, the second particles can protrude from the surface of the adhesive portion regardless of the position of the second particles in the adhesive portion.

The second particle may have a spherical shape. In this case, the second particles can protrude from the surface of the adhesive portion regardless of the posture of the second particles in the adhesive portion.

The second particle may be formed of a heat-resistant material. In this case, heating for thermal expansion can suppress damage to the second particles.

The first layer may be provided on one surface of the substrate, the second layer is provided on the other surface of the substrate, and the second layer may be provided with the adhesive portion, and the adhesive permeable layer which is provided on the surface of the adhesive portion and allows the adhesive composition to permeate during thermal expansion of the first particles. In this case, the adhesive sheet contains the second particles on one side and the adhesive permeable layer on the other side. For example, in a case where the first layer and the first layer are brought into contact with each other when the adhesive sheets are stored in superposition, there is a possibility that the adhesive portions are bonded to each other. On the other hand, in a case where the first layer and the second layer are brought into contact, an adhesive permeable layer can be interposed between the adhesive portions. As a result, it is possible to prevent the adhesive sheets from being adhered to each other during storage.

The adhesive permeable layer may be formed of a material having a glass transition temperature higher than the curing starting temperature of the adhesive composition constituting the adhesive portion. In this case, the adhesive permeable layer can be prevented from being affected by heating for curing the adhesive composition.

The adhesive permeable layer may be a nonwoven fabric.

The first layer may be provided on one surface of the substrate, and a third layer having adhesiveness at 20° C. may be provided on the other surface of the substrate. The third layer contains an adhesive material having adhesiveness (with initial tack) at 20° C. In a case of containing the third layer, in a state where the third layer side is bonded to the adherend, the third layer is inserted between the adherend and the other adherend while sliding the first layer side, and then heated so that the first layer side expands and cured to bond the adherend to the other adherend. The third layer may combine the adhesiveness and thermosetting property at room temperature, and in this case, the bonding strength can be increased by thermally curing the third layer side together with expansion and thermal curing of the first layer side when heated. A third layer may be exposed, and a liner may be provided outside thereof.

A particle diameter of the first particle may be smaller than 50 μm.

A particle diameter of the second particle may be larger than 10 μm.

Next, examples of the present invention will now be described in detail.

Example 1

As an epoxy resin, NPPN442 (available from NANYA) was preheated in an oven at 65° C. to soften it. 48.5 g of the resin, 0.49 g of YSLV-80XY (available from Nippon Steel & Sumikin Materials Co., Ltd.) as an epoxy resin, and 35 g of methyl ethyl ketone (MEK) (available from Wako Pure Chemical Industries, Ltd.) as a solvent were added into a 225 ml glass container, and all resins were dissolved in MEK. 3.5 g of BTA-731 (available from Dow Chemical) as a toughening agent (core shell toughener), 8.07 g of DICYANEX1400F (available from Evonik Japan) as a curing agent, 4.2 g of nanosilica Ultrabond (available from Cabot Japan) as a rheological agent, 14 g of YP-50EK35 (available from Nippon Steel & Sumikin Materials Co., Ltd.) as a thermoplastic resin, 0.28 g of OFS-6040 (available from Dow Toray Co., Ltd) as a silane coupling agent, 6 g of FN-100 SSD (available from Matsumoto Yushi-Seiyaku Co., Ltd.) as a first particle, and 0.65 g of 2MZA-PW (available from Shikoku Chemicals Corporation) as a curing accelerator were added into a glass container, and the mixture was dispersed using a homogenizer for about an hour to obtain an adhesive solution A.

15 g of the adhesive solution A prepared as described above was weighed in a 225 ml glass container. Then, 2 g of SE-050T (second particle having an average particle diameter of 43 μm) (available from Negami Chemical Industrial Co., Ltd) was added to a glass container, and mixed for two minutes at 2000 rpm in an automatic revolution stirrer to obtain a solution (which may be referred to as an adhesive solution B) of the adhesive solution A and the second particle. This solution was applied to Teonex Q51 (available from Toyobo Film Solutions Limited.) (75 μm of PEN film) and dried so that the weight of the adhesive coating was approximately 51 g/SQM. The coated liner was dried at 65° C. for three minutes and dried at 100° C. for three minutes.

The adhesive solution A prepared as described above was applied to Purex A50 (available from Teijin DuPon Osaka Japan), which is a silicon liner, and dried so that the weight of the adhesive coating was approximately 47 g/SQM. The coated liner was dried at 65° C. for three minutes and dried at 100° C. for three minutes.

The adhesive sheet containing the second particles on the pen film was laminated to Purex A50, which was a silicon liner. The adhesive surface was then brought into contact with the coating side of the silicone. Then, the adhesive sheet covered by the silicon liner was laminated to the PEN so that the adhesive surface was in contact with the surface of non-coated PEN. A laminated sheet was formed by passing a rubber roll heated at 60° C. The liner of the adhesive portion that did not contain the second particles was removed, and 14 g of paper (available from Daio Paper Corporation) was laminated to the adhesive portion, and the laminated sheet was laminated again by passing the laminated sheet through a rubber roll heated at 60° C. Finally, the silicon liner of the adhesive portion free from the second particles was removed, resulting in an adhesive sheet.

The conditions of the adhesive sheet according to Example 1 are indicated in a table of FIG. 4. Among the items in the table, "adhesive" refers to the adhesive solution A of paragraph 0043 of Example 1, in which the units are grams. Note that the same adhesive as in Example 1 was used for other examples. "SE050T" refers to the weight of SE050T, which is a second particle having an average particle diameter of 43 μm, in which the units are grams. "SE030T" refers to the weight of SE030T, which is a second particle having an average particle diameter of 34 μm, in which the units are grams. "J5P" refers to the weight of J5P, which is a second particle having an average particle diameter of 3.5 μm, in which the units are grams. "MEK" refers to the amount of MEK added further to the adhesive solution A, in which the units are grams. "Second particle volume fraction" refers to the approximate volume fraction of the second particles calculated by assuming that the adhesive portion containing the first particles and the second particles have a specific gravity of 1.0. "Adhesive application amount" refers to the amount of adhesive applied after drying the adhesive of the first layers. "Paper surface adhesive application amount" refers to the amount of adhesive applied to the second layers. "Total thickness" refers to the thickness of the entire adhesive sheet. "L" is a value of a dimension L as illustrated in FIG. 1. "Rz" is a size of a protruding amount Rz illustrated in FIG. 1. "t" is a value of a dimension t as illustrated in FIG. 1. "Blocking (against paper)" refers to the results of the blocking test described below. "Shear force" refers to the results of a shear force test described below.

Examples 2 to 7

These are the same as Example 1 except that the conditions shown in the table in FIG. 4 were changed.

Comparative Examples

Comparative Example 1 was a material in which the second particles were free from the adhesive portion. Furthermore, Comparative Example 1 did not have paper as an adhesive permeable layer. Comparative Example 2 was a J5P having a second particle of 3.5 μm. Note that, as Comparative Example 3, a material having paper on both sides and no second particles in the adhesive portion was prepared.

Blocking Test

The sheets produced in the Examples and Comparative Examples were subjected to a blocking test using the following procedure.

Sample size 25 mm×25 mm

Two samples of the same composition were stacked, two samples were sandwiched between SUS304 plates (100 mm×50 mm, thickness of 1 mm, weight of 40 g), and a 500 g weight was placed thereon.

Samples were left in an oven set at 40° C. for 4.5 days.

Sample was removed from the oven, the weight was removed, and left at room temperature for an hour or more.

SUS304 plate was removed, and two-sheet sample was carefully peel to observe an attached state.

The attached state was observed and evaluated according to the following criteria.

Evaluation 1 Attachment between samples

Evaluation 2 Light attachment on surface of sample

Evaluation 3 Light attachment on end surface moiety of sample

Evaluation 4 Slight attachment on end surface moiety of sample

Evaluation 5 No attachment

Shear Adhesive Strength Test

The sheets produced in the Examples and Comparative Examples were subjected to a shear adhesive strength test using the following procedure.

Sample size 12.5 mm×25 mm

Two SPCC substrates whose surface has been cleaned with MEK were prepared, a tack-free sample and a 0.3 mm thick spacer were placed on one SPCC substrate, and still another SPCC substrate was placed on the sample and spacer.

An interval between the two substrates was fixed using a clamp.

Samples were left in an oven set at 180° C. for 30 minutes, and the samples were heated.

The clamps were removed and a shear adhesion test was performed at a shear tensile rate of 5 mm/min.

Figure 3B:
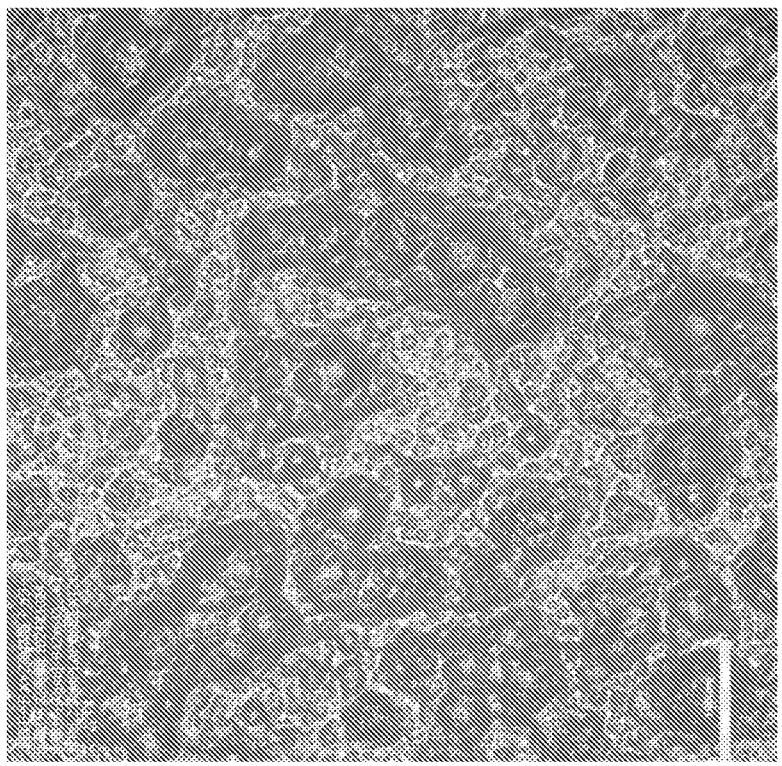
FIG. 3B is a photograph of the surface of the adhesive portion of Example 1.
Figure 3A:
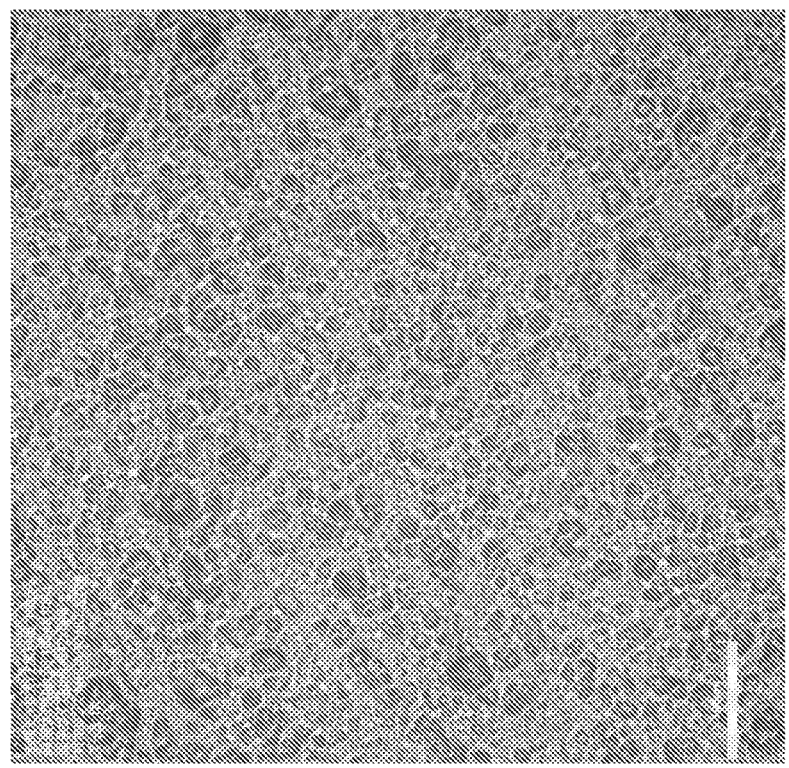
FIG. 3A is a photograph of a surface of an adhesive portion of Comparative Example 1.

The results of the blocking test and the shear adhesion test are shown in the table in FIG. 4. In addition, a photograph of the surface of the adhesive portion of Comparative Example 1 is as illustrated in FIG. 3(a), and a photograph of the surface of the adhesive portion of Example 1 is illustrated in FIG. 3(b).

REFERENCE SIGNS LIST

1 . . . Adhesive sheet
3 . . . Substrate
4 . . . First layer
6 . . . Second layer
11, 13 . . . Adhesive portion
12 . . . Second particle
14 . . . Adhesive permeable layer
22 . . . First particle

What is claimed is:

1. An adhesive sheet being thermally expandable and thermosetting, the adhesive sheet comprising:
an insulative substrate;
a first layer provided on a first side of the substrate, wherein the first layer contains
a first adhesive portion having
first particles being thermally expandable, and
second particles each comprising a non-thermally expandable, heat-resistant material that is a different material from that of the first particles, wherein each of the second particles is larger than each of the first particles, wherein at least some of the second particles are larger than a thickness of the first adhesive portion; and
a second layer provided on a second, opposite side of the substrate, wherein the second layer comprises
a second adhesive portion comprising a plurality of the first particles and
an adhesive permeable layer, formed from a non-woven fabric, provided on a surface of the adhesive second portion and capable of permeating an adhesive composition upon thermal expansion of the first particle, and wherein the adhesive sheet is in a tack-free state prior to thermal expansion of the adhesives in the first and second layers.

2. The adhesive sheet according to claim 1, wherein the second particle has a spherical shape.

3. The adhesive sheet according to claim 1, wherein a particle diameter of the first particle is smaller than 50 μm.

4. The adhesive sheet according to claim 1, wherein a particle diameter of the second particle is larger than 10 μm.

5. The adhesive sheet according to claim 1, wherein a one or more second particles protrude from about 6 μm to about 60 μm from a top surface of the first layer.

6. A method of adhering two surfaces using a thermally expandable adhesive sheet, the method comprising:
selecting a thermally expandable adhesive sheet comprising:
an insulative substrate;
a first layer provided on a first side of the substrate, wherein the first layer contains
a first adhesive portion having
first particles being thermally expandable, and
second particles each comprising a non-thermally expandable, heat-resistant material that is a different material from that of the first particles, wherein each of the second particles is larger than each of the first particles, wherein at least some of the second particles are larger than a thickness of the first adhesive portion; and
a second layer provided on a second, opposite side of the substrate, wherein the second layer comprises
a second adhesive portion comprising a plurality of the first particles and
an adhesive permeable layer, formed from a non-woven fabric, provided on a surface of the adhesive second portion and capable of permeating an adhesive composition upon thermal expansion of the first particle, and wherein the adhesive sheet is in a tack-free state prior to thermal expansion of the adhesives in the first and second layers;
positioning the thermally expandable adhesive sheet in a tack-free state between two surfaces to be adhered, wherein the thermally expandable adhesive sheet is narrower than a gap between the surfaces;
applying heat to the thermally expandable adhesive sheet to initiate thermal expansion of the first particles; and
allowing the adhesive composition to cure, thereby bonding the two surfaces together.

7. The method according to claim 6, further comprising the step of adjusting the thickness of the substrate to match the gap between the surfaces to be adhered.

8. The method according to claim 6, wherein the second particles protrude from the adhesive portion before heating, maintaining separation between the adhesive portion and the surface to be adhered.

9. The method according to claim 6, wherein the thermally expandable adhesive sheet provides electrical insulation between in a motor assembly, wherein a first surface to be adhered to is a stator body surface and a second surface to be adhered to is a coil.

* * * * *